Oct. 29, 1968
F. W. FRICK ET AL  3,408,565
APPARATUS FOR SEQUENTIALLY TESTING ELECTRICAL COMPONENTS UNDER
CONTROLLED ENVIRONMENTAL CONDITIONS INCLUDING A COMPONENT
SUPPORT MATING TEST HEAD
Filed March 2, 1966
2 Sheets-Sheet 1
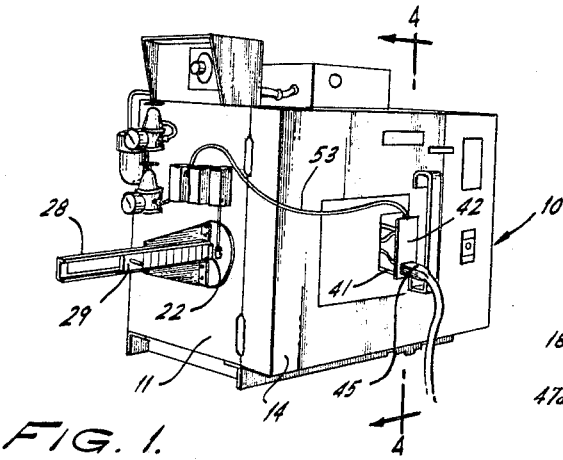
FIG. 1.
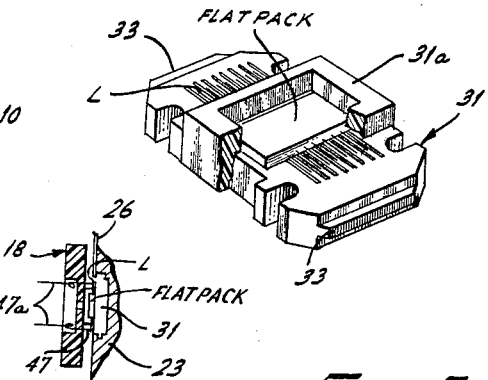
FIG. 2.
FIG. 3.
FIG. 4A.
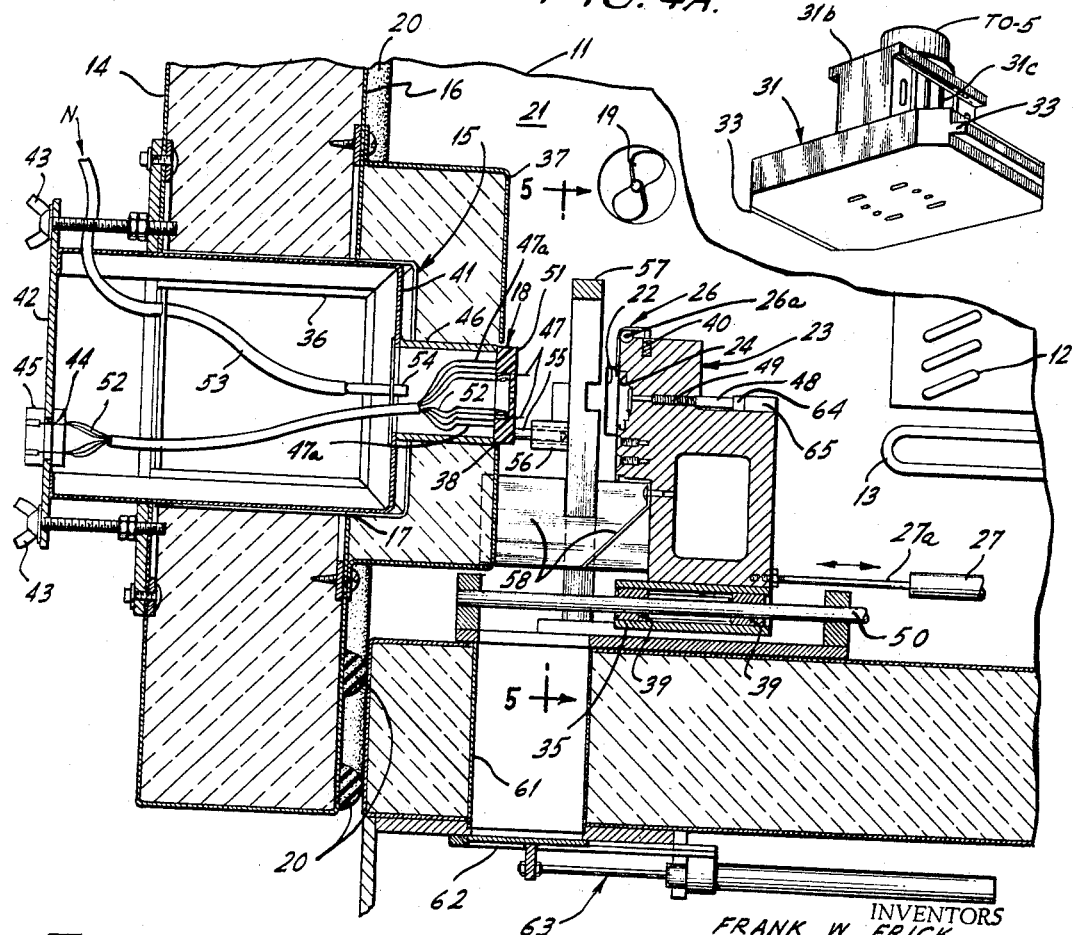
FIG. 4.
INVENTORS
FRANK W. FRICK
ROBERT E. KIRSCHMAN
BY
Harry W. Hargis III
AGENT

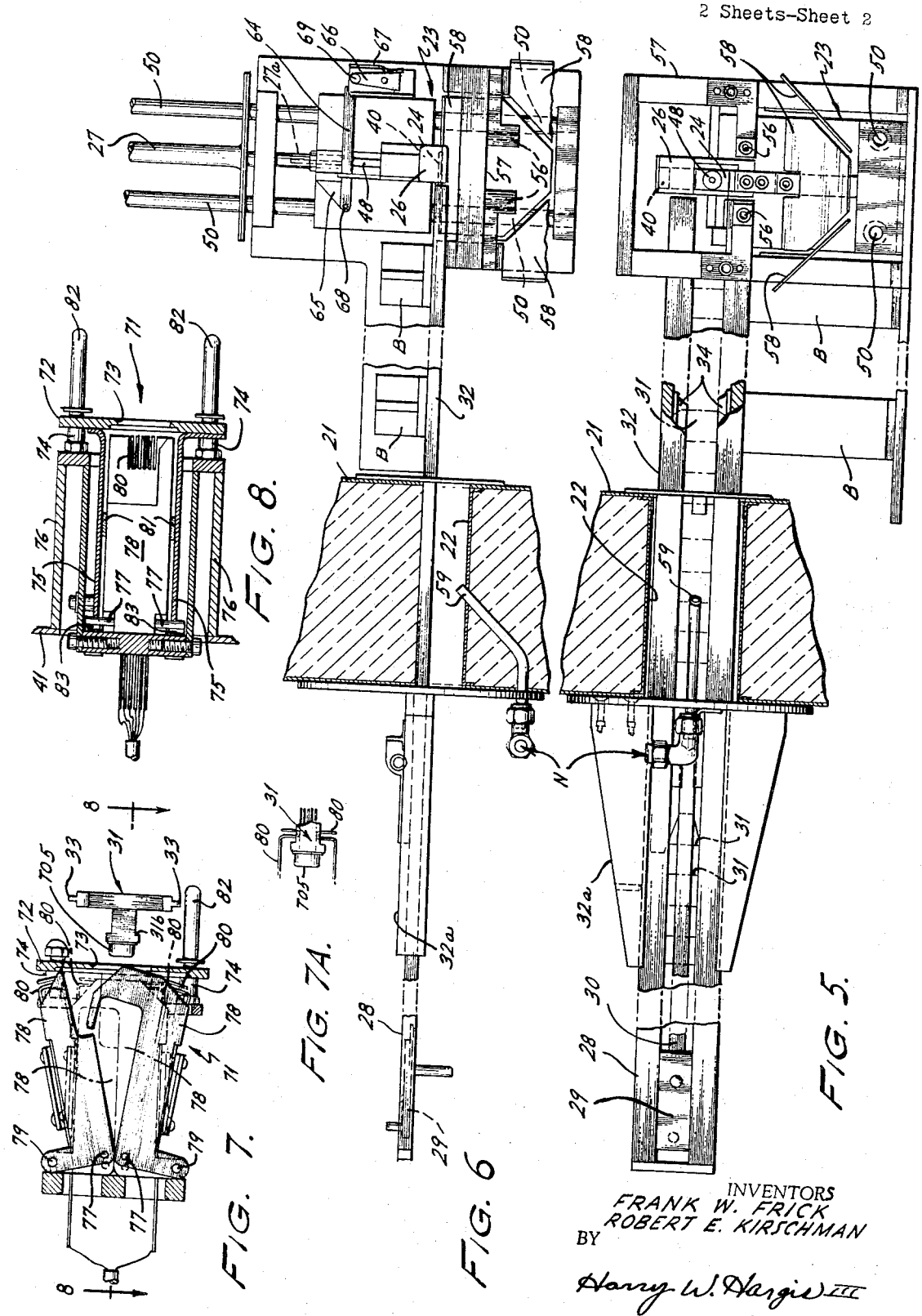

United States Patent Office 3,408,565
Patented Oct. 29, 1968

3,408,565
APPARATUS FOR SEQUENTIALLY TESTING ELECTRICAL COMPONENTS UNDER CONTROLLED ENVIRONMENTAL CONDITIONS INCLUDING A COMPONENT SUPPORT MATING TEST HEAD
Frank W. Frick, Lansdale, and Robert E. Kirschman, Sellersville, Pa., assignors to Philco-Ford Corporation, a corporation of Delaware
Filed Mar. 2, 1966, Ser. No. 531,235
5 Claims. (Cl. 324—158)

ABSTRACT OF THE DISCLOSURE

Apparatus for the automatic testing of electrical components, such as integrated circuit devices of the type including a housing from which a plurality of lead wires extend. An environmental chamber maintains an ambient atmospheric temperature condition within which the devices are tested. A mounting support is provided for each of a plurality of the devices, and a loading station is provided for introducing the supports into the chamber for movement through the chamber by a conveyor, in sequential step-by-step fashion. Test probe means within the chamber includes a set of test probe contacts engageable by the lead wires of the devices as the conveyor moves each support toward the test probe contacts. Each device is ejected from the chamber by an ejector mechanism after it has been tested. The test probe contacts are maintained at the controlled chamber temperature, while the test circuitry associated with the probe contacts is maintained at the temperature prevailing outside the chamber.

---

This invention relates to electrical test apparatus, and more particularly to improved mechanized test apparatus adapted to test electrical components under controlled environmental conditions including extremes of temperature.

While of broader applicability, the invention has special utility in the handling of, and establishing of electrical test connections to, components such as integrated microcircuit devices of the type comprising protective, hermetically sealed envelopes or housings from which extend a plurality of lead wires.

When integrated microcircuit devices are tested electrically, it is often required that the test be conducted at such temperatures as they may be subjected to in the course of their intended use. These temperatures may comprise, for example, a range from about −55° C. to +125° C. In order to stabilize the temperature of a device at the value desired for testing, it is subjected to an environment maintained at the selected temperature value for a predetermined required length of time to allow stabilization. It is important that certain of the components comprising the test circuits not be subjected to these temperature extremes and that, instead, they be subjected only to the atmospheric temperatures normally prevailing within the room which houses the test equipment. It has been difficult heretofore to meet this requirement.

Variations in packaging of the circuit devices give rise to further difficulties in providing automatic test apparatus. For example, and in accordance with presently preferred practice, integrated circuit device housings may take either the form of a so-called "flat-pack" in which sets of leads extend in opposite directions and are coplanar with the housing, or the form of a so-called "TO-5 can" from which leads extend unidirectionally.

It is a broad objective of this invention to provide novel and improved test apparatus adapted rapidly and automatically to test integrated circuit devices of various types, and of relatively small size, under conditions of such extreme temperatures as they may be subjected to when in use.

It is another, and more specific objective of the invention to provide improved environmental test apparatus for integrated circuit devices of various known types, which apparatus enhances disposition of the test circuitry in close proximity to the devices undergoing test.

It is a further objective of the invention to provide novel unitary electrical test apparatus capable of handling electrical circuit devices of various configurations, and which apparatus is featured by a high degree of compactness as well as by a facility for handling and testing devices of varied types.

It is a further specific objective of the invention to provide environmental test apparatus for integrated microcircuit devices that minimizes lead capacitance by facilitating application of test probes in very close proximity to the circuit device, irrespective of the shape of its housing.

To the foregoing general ends the invention contemplates, in apparatus for the automatic testing of electrical components, such as an integrated circuit device including a housing having lead wires extending therefrom, the provision of an environmental chamber for maintaining an ambient atmospheric temperature condition within which the components are to be tested, support means for each of a plurality of the components, and conveyor means for moving the support means through the chamber in sequential, step-by-step fashion. There is further provided means defining a loading station for introducing the support means into the chamber for movement by the conveyor means, and test probe means within the chamber. The test probe means comprises a set of test probes engageable by the lead wires of the components as each supporting means is moved by the conveyor means toward the test probe means. There is further provided means for ejecting each component as it is tested. It is an important advantage of the invention that the test probes are maintained at the controlled extreme temperature, while the test circuitry associated with the probes is maintained at the temperature of the ambient atmosphere.

A preferred sequence of operations from the time an integrated circuit device or component is inserted into its carrier to the time it is automatically extracted from the test apparatus includes: (1) placing a device in an individual carrier; (2) inserting a plurality of such carriers into a loading magazine; (3) introducing carriers from the loading magazine through an opening in a wall of the test chamber and allowing the carriers to remain for a period of time sufficient to stabilize the temperature of the devices at the temperature within the chamber; (4) indexing the carriers singly to a position in which the devices are presented for registry with the set of test probes; (5) feeding the carriers sequentially and individually into position for engagement of the device leads with the set of test probes; (6) testing the device; (7) withdrawing the device from contact with the set of test probes; and (8) ejecting the carrier and its associated tested device from the test chamber. The invention provides novel compact apparatus for carrying out the foregoing operations automatically and sequentially.

The foregoing as well as additional objectives and advantages of the invention will be more clearly understood from a consideration of the following description, taken in light of the accompanying drawings in which:

FIGURE 1 is a perspective showing, on a somewhat reduced scale, of apparatus embodying the invention;

FIGURE 2 is an enlarged perspective showing of one form of carrier-supported component means capable of being tested by the apparatus illustrated in FIGURE 1, and with portions of the carrier broken away;

FIGURE 3 is a view similar to FIGURE 2, but taken from a different angle showing another form of component means capable of being tested by the apparatus illustrated in FIGURE 1 and illustrating it as supported by a carrier of the kind used to support the component shown in FIGURE 2;

FIGURE 4 is a sectional showing, with parts removed or broken away, of test mechanism embodying the invention, and looking in the direction of arrows 4—4 applied to the apparatus illustrated in FIGURE 1;

FIGURE 4A is an enlarged operational showing of a portion of the apparatus illustrated in FIGURE 4;

FIGURE 5 is an elevational showing, with parts removed or broken away, of apparatus seen looking in the direction of arrows 5—5 applied to FIGURE 4;

FIGURE 6 is a top plan view of apparatus seen in FIGURE 5;

FIGURE 7 illustrates a modified embodiment of the invention, the view being limited to those parts of the apparatus which establish test contact between component leads and test probes;

FIGURE 7A is a further operational showing of a portion of the apparatus illustrated in FIGURE 7; and FIGURE 8 is a sectional view, with parts removed or broken away and taken as indicated by the line 8—8 in FIGURE 7.

With more particular reference to the drawings and first to FIGURES 1 and 4, our environmental test apparatus 10 comprises a thermally insulated chamber 11 having provision either for cooling its interior, such as cooling coil 12, or for heating its interior, such as heating coil 13. A fan 19 is provided in the chamber to ensure uniform temperatures of objects within the chamber by creating positive circulation of air throughout. A door 14, affording access to the chamber, is hinged vertically about its left hand edge, as seen in FIGURE 4, and is latched in the region of its right hand edge. Means for selectively energizing either the cooling coil 12 or the heating coil 13, and the fan 19, and the controls (not shown) associated therewith, are conventional and will not be described further in detail.

Door 14 is thermally insulated, as are the walls of the chamber, and is provided with a generally box-shaped recess 15 disposed and adapted to receive and to position test probe means 18 for engagement with components to be tested. As will be more fully appreciated from what follows, recess 15 extends through the door insulation and serves as a housing for the test probe means 18. The door includes an inner panel 16 sealed to chamber 11 by gaskets 20 and provided with an aperture 17 aligned with the recess 15. A device to be tested inside chamber 11 may be moved toward test probe means 18 and into electrical engagement with the contact elements thereof, described more fully below.

A detailed description of the electrical test circuits associated with the test probe means 18 is not necessary for understanding of the invention, and no description of such circuits is undertaken. Accordingly, the foregoing as well as the ensuing descriptive matter is directed to novel mechanical constructional features that characterize the invention. However, it will be appreciated that the test circuits are maintained at room temperature conditions, whereas the test probes advantageously are maintained at the extreme temperature condition within the chamber.

Carriers of the type seen at 31 in FIGURES 2 and 3, each support an integrated circuit device to be tested. It is a feature of the invention that either devices housed in flat-pack envelopes, as seen in FIGURE 2, or devices housed in so-called TO-5 cans, as seen in FIGURE 3, may be tested using the same essential transport and test mechanism. With respect to FIGURE 2 it is seen that the flat-pack housed device is supported with its leads L extending into upwardly facing slots and with its housing portion nested within a central aperture in the carrier. A U-shaped clamp 31a overlies the housing and portions of the leads and is held through frictional engagement of the leg portions of the clamp with sides of the carrier. It is therefore appreciated that each carrier 31 is adapted to support a flat-pack device in such a position that its leads face a side of the carrier 31, that is, upwardly as seen in FIGURE 2.

With respect to FIGURE 3 it is seen that the carrier body includes a raised portion 31b provided with longitudinally extending slotted openings 31c arranged and adapted frictionally to retain the circular array of lead wires of a device housed within a TO-5 can. It will be appreciated that the carrier 31 supports a TO-5 can device in such a position that its lead wires face laterally and are accessible for engagement by test probes extensible into the slotted openings 31c (see also FIGURE 7A).

Carriers 31 as seen in either FIGURE 2 or FIGURE 3 are placed in a loading magazine 28 (FIGURES 1, 5 and 6) having the configuration of a pair of confronting elongate channels. As will be described later in more detail, with the magazine 28 inserted in a guide 32a aligned with a loading port 22 (FIGURE 1, and center of FIGURE 4), carriers 31 are inserted through the loading port into an elongated support or track 32 (FIGURES 5 and 6) which may also be termed a transfer magazine, by forcible movement of the carriers along the track. It will be appreciated that each carrier 31 includes laterally outwardly presented ridges 33 that are slidably received within the grooves 34 in track 32, as well as in the confronting channels in the loading magazine.

The loading magazine 28 includes a slidable, plunger-like element 29 that engages the end one of a row of carriers 31. A substantially constant-tension, extensible and retractable coiled spring 30 resiliently urges element 29 against carriers 31 to force them from the magazine and along track 32 when it is aligned with test head 23. Track 32 is held in place, for alignment with extension 32a and test head 23, by brackets B extending from the floor of the chamber.

When transfer magazine or track 32 has been loaded with carriers 31, test head 23 (FIGURES 4–6) is moved to test one device at a time. The rate of advance of the succeeding devices is preset to insure temperature stabilization of the circuit before they reach test probe means 18.

Considering in more detail the test probe means and its associated structure, the recess 15 is generally rectangular in shape and is lined by insulated surfaces. Conveniently, the insulation may comprise one of the foamed plastics currently in use. A frame 36 built-up of angle members, such for example as angle iron, fits snugly into the corners of recess 15 as seen in FIGURE 4. An insulated cap 37 provided with a smaller rectangular opening 38 overlies inner liner 16 adjacent the insulation-lined recess 15. A similarly formed frame 41 also built-up of angle members fits into the above described frame 36, and comprises the basic support structure for the test probe means 18. The test probe frame 41 fits closely withprobe means 18. The test probe frame 41 fits closely within the frame 36, and is held in this position by a plate 42 affixed thereto and held in spaced relation to door 14 by thumb screws 43. Plate 42 is apertured at 44 to receive and frictionally to support a receptacle 45 serving as the terminal connection for test probe means 18.

The inner end of the test probe frame 41 comprises a rigid, hollow, rectangular sleeve 46 that projects into the similarly shaped opening 38 in thermally insulated cap 37. The test probes 47, per se, are supported by an electrically insulative block 51 that caps the end of sleeve 46 and projects into chamber 11. The test probes 47 comprise bent wires mounted on the block by screws (not shown). Each of probes 47 has a forwardly projecting resilient contact portion and a rearwardly projecting terminal portion 47a connected to receptacle 45 by means of lead wires 52. In the present embodiment, test probes 47 are fourteen in number, in correspondence within the number of leads projecting from the flat-pack, shown in FIGURE 2, and extend across the face of insulative block 51 upper and lower horizontal rows of seven probes each.

In order to minimize the inflow of air and moisture to chamber 11, a positive flow of an inert gas, such for example as dry nitrogen (N), is provided through a hose 53 terminating in a discharge nozzle 54 directed into the hollow sleeve 46 and toward insulative block 51. A pair of parallel prongs 55 extend outwardly from insulative block 51 and into sockets 56 formed in a frame 57 supported upon the floor of chamber 11. This prong and socket arrangement ensures registry of probes 47 with the test head fully described below.

Still with reference to FIGURE 4, and having further reference to FIGURES 5 and 6, the left hand side wall 21 of chamber 11 includes an opening 22 and track 32 (FIGS. 5 and 6) extends therethrough. A nitrogen supply line includes a nozzle 59 for directing this gas into opening 22 to inhibit the inflow of moisture to chamber 11. The component loading magazine 28 (also FIGURE 1) may be positioned and aligned with track 32 to feed devices to the test head 23 disposed within chamber 11. Test head 23 includes socket means 24 for receiving a device supported by a carrier and operable to move components to be tested toward test probe means 18, as will be described more fully in what follows. Test head 23 comprises a reciprocable member movable toward and away from test probe means 18, in the course of which the lead wires L of a flat-pack are engaged by probes 47 as illustrated in FIGURE 4A. After being tested, and as the test head is moved away from the probes, the device and its carrier are released by a latch 26 carried by head 23 and drop through an opening 61 (FIGURE 4) provided in the bottom wall of the cabinet, for temporary storage in a suitable receptacle (not shown) outside the chamber. Opening 61 has a sliding door 62 positioned thereover. This door is opened and closed by a pneumatically operated linkage 63 at a rate sufficient to permit a tested article to fall through with the least amount of thermal changes within the chamber due to the door being open. Three angularly positioned baffles or deflectors 58 are supported by frame 57 and are so aligned with opening 61 as to ensure against dropping of a tested device into the operating mechanism for the test head.

Considering test head 23 in more detail, and along with other elements of the apparatus disposed within chamber 11, the base 35 (FIGURE 4) of the test head is provided with a pair of tubular, parallelly extending bearings 39 that extend transversely of the plane of door 14 and slidably engage a pair of similarly extending rods 50. Rods 50 are rigidly supported, upon the floor of chamber 11, at their ends, and in a region intermediate their ends. As mentioned previously, there is disposed upon the test head 23 a slotted support 24 for an insulative device-carrier, the support providing for lateral insertion of a carrier from track means 32 hereinafter to be more fully described.

An L-shaped latch member 26 has a portion of one of its legs forming the upper slot of the support, is hinged along its vertex at 26a (FIGURE 4), and has its other leg extending over and applying a compressive force to a coiled spring 40 seated within a cylindrical recess in test head 23.

As best seen in FIGURE 4, a plunger 48, resiliently biased by coiled compression spring 49, extends through a horizontal bore in test head 23. Plunger 48 terminates at its one end (left hand) in a flange disposed in a countersunk hole in the bottom of slotted support 24, and terminates at its other end (right hand) in a rounded projection.

As best seen in FIGURE 6, a lever 64 is horizontally pivotable at 68 about its one end and urged against a stop 65 by the resiliently biased plunger 48. A latch 66 is pivotally mounted at 69, and is resiliently urged by a leaf spring 67 to a position in which movement of test head 23 to the left hand (FIGURE 4) will cause lever 64 to strike latch 66 and displace it pivotally to the right (FIGURE 6). Upon movement of test head 23 to the right (FIGURE 4), lever 64 will strike latch 66 causing the lever to be displaced in a direction to force plunger 48 to the left (FIGURE 4), thereby pushing a carrier 31 from the slotted support 24. Movement of carrier 31 from slotted support 24 is accommodated by pivotation of the L-shaped latch 26.

To ensure alignment of a device to be tested with the test probes 47, and as best seen in FIGURE 4, frame 57 is disposed between test head 23 and the test probes 47 and includes a pair of parallel bores or sockets 56 that receive prongs 55 projecting from the test probe insulative support 51. This arrangement in effect "locks" the probes 47 into position, preventing displacement due, for example, to thermally induced, differential expansions between door and portions of chamber 11 that support the test head. The test probe and test head apparatus is therefore mechanically stable over the relatively wide range of operating temperatures (i.e. −55° to 125° C.).

An air cylinder 27 includes a plunger 27a operable by air pressure to translate test head 23, and thus to move the carrier, and the device to be tested, to the test probes. When the air pressure in cylinder 27 is released, its plunger is operable to retract the test head for ejection of the carrier from test head 23. After ejection of a test device and its carrier, and when test head is again aligned with the track 32, its slotted support 24 receives another carrier, and the above steps are repeated.

With more particular reference to FIGURES 7, 7A, and 8, a modified test probe means 71 for testing a TO–5 type device comprises a base 72 provided with a generally rectangular opening 73. As will be appreciated, opening 73 is of sufficient size to permit extension therethrough of the elevated portion 31b of a carrier 31, as it is moved to the left by test head 23, yet small enough that the main body portion of a carrier will engage base 72 as the carrier continues to be moved to the left by the test head 23. Base 72 is slidable on four relatively short rods 74 affixed to rectangular sleeve 76 (FIGURE 8 only), and includes a pair of parallel extensions 75 disposed within the rectangular sleeve. Sleeve 76 in this instance corresponds to sleeve 46 illustrated in FIGURE 4 and is adapted to be supported by frame 41 disposed in the door in the same manner as sleeve 46. The extensions 75 engage a pair of pins 77 extending through a pair of normally open jaws 78 (solid lines, FIGURE 7) of electrically insulative material. The jaws are held open by the leaf spring 83 interposed below extensions 75 and pins 77. Jaws 78 are pivotable about another pair of pins 79 to the broken line positions, the construction and arrangement being such that base portion 72 is moved by the carrier 31 moving to the left. This movement of base 72 causes the extensions 75 to move the inner pair of pins 77, whereby jaws 78 are pivoted about the outer pins 79 into the broken line position in FIGURE 7 (see also FIGURE 7A) effecting engagement of resilient loops of test probes 80 carried by jaws 78, with lateral portions of the TO–5 leads. Friction pads 81 between the confronting surfaces of jaws 78 and extensions 75 help maintain lateral stability of the jaws. A pair of prongs 82 extend from the lower relatively short rods 74 and serve as aligning pins for the test probes and the test head, as do the pins 55 in FIGURE 4.

It will be appreciated that the invention affords electrical test apparatus capable of handling circuit devices of various configurations. The apparatus is especially adapted for testing integrated microcircuit devices and minimizes lead capacitance by disposing the lead wires in a manner facilitating application of test probes in very close proximity to the circuit device. Moreover, the invention ensures that the test probes and the device both are maintained at the desired environmental temperature extreme, whereas the test circuits are maintained at normal ambient atmospheric conditions.

We claim:

1. In apparatus for the automatic testing of electrical components, each including a housing having lead wires extending therefrom: an environmental chamber for maintaining an ambient atmospheric temperature about the components to be tested; individual support means for each of a plurality of components, and comprising an insulative base portion with oppositely presented ridges; conveyor means for moving the support means through the chamber in sequential, step-by-step fashion; means defining a loading station for introducing the support means into the chamber for movements by the conveyor means; test probe means within the chamber comprising a set of test probes engageable by lead wires of the components; test head means for receiving each support means as it is moved by the conveyor means, and operable to move each support means and component carried thereby toward the test probe means for electrical engagement of lead wires with the latter, said test head means further including slots within which said ridges are slidably received, at least one of said slots being defined by means yieldable in a direction transverse said slots; and means for ejecting the support means and tested components from said chamber, said means for ejecting being operable to urge said support means against said yieldable means to release said support means from said slots.

2. Apparatus according to claim 1, and further characterized in that said means for ejecting comprises a plunger movable transversely of a component support between a retracted position and an extended position, in which latter position the plunger is operable to urge the support from said test head, said plunger being moved to its recited extended position in response to movement of said test head means away from said test probes.

3. In apparatus for the automatic testing of electrical components, each including a housing having lead wires extending therefrom: an environmental chamber for maintaining an ambient atmospheric temperature about the components to be tested, said chamber comprising insulation-filled walls of substantial thickness, one of which walls includes a recess extending from without the chamber into said insulation; individual support means for each of a plurality of components; conveyor means for moving the support means through the chamber in sequential step-by-step fashion; means defining a loading station for introducing the supporting means into the chamber for movements by the conveyor means; test probe means comprising a set of test probes extending from without said chamber, into said recess, and presented inwardly of said chamber to a position closely adjacent an inner surface portion of said wall for engagement with the lead wires of components to be tested within said chamber, said test probes being arranged in sets presented toward one another and mounted for pivotal movements toward and away from one another, said test probe means further including linkage means for effecting the recited movements of said test probes in response to engagement of a component support means with said linkage means, the resultant pivotal movement of said test probes causing them to engage lead wires of said components; test head means for receiving each support means as it is moved by the conveyor means, and operable to move each support means and component carried thereby toward the test probe means for the recited electrical engagement of lead wires with the latter; and means for ejecting the support means and tested components from said chamber.

4. In apparatus for automatic testing of electrical components of the type including a housing having lead wires extending therefrom, and an insulative base portion having oppositely presented edge portions: an environmental chamber for maintaining an ambient atmospheric temperature about the components to be tested; conveyor means for moving said components through the chamber in sequential, step-by-step fashion; means defining a loading station for introducing the components into the chamber for movements by the conveyor means; test probe means within the chamber comprising a set of test probes engageable with lead wires of the components; test head means for receiving each component as it is moved by the conveyor means, and operable to move each component toward the test probe means for electrical engagement of lead wires with the latter, said test head means further including slots within which said edge portions of said insulative base portions are slidably received, at least one of said slots being defined by means yieldable in a direction transverse said slots; and means for ejecting tested components from said chamber, said means for ejecting being operable to urge each said insulative base portion of a tested component against said yieldable means to release said base portion from said slots.

5. Apparatus according to claim 4, and further characterized in that said means for ejecting comprises a plunger movable transversely of a component base portion between a retracted position and an extended position, in which latter position the plunger is operable to engage said base portion and urge the component from said test head, said plunger being moved to its recited extended position in response to movement of said test head means away from said test probes.

References Cited

UNITED STATES PATENTS

| | | | |
|---|---|---|---|
| 2,922,954 | 1/1960 | Bigelow | 324—158 |
| 3,009,109 | 11/1961 | Jankowski | 324—158 |
| 3,039,604 | 6/1962 | Bickel | 324—158 XR |
| 3,239,059 | 3/1966 | Cole | 324—158 XR |
| 3,059,215 | 10/1962 | Proskauer. | |

RUDOLPH V. ROLINEC, *Primary Examiner.*

E. L. STOLARUN, *Assistant Examiner.*